Figures 1, 2, 3, 4, 5:
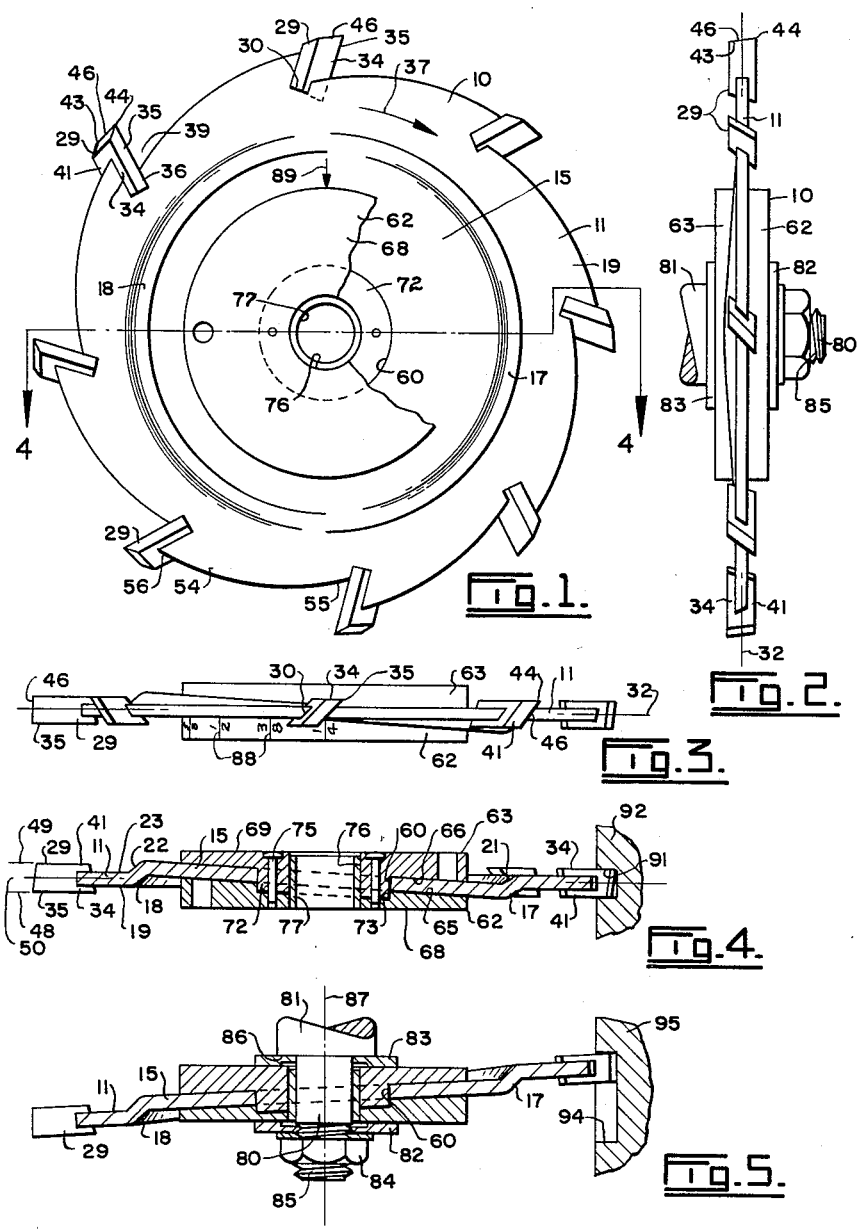

Jan. 26, 1960 S. SAM 2,922,449
WOBBLE DADO ASSEMBLY
Filed April 7, 1958

INVENTOR.
SAMUEL SAM
BY
Fetherstonhaugh & Co.
ATTORNEYS

United States Patent Office 2,922,449
Patented Jan. 26, 1960

2,922,449

WOBBLE DADO ASSEMBLY

Samuel Sam, Richmond, Vancouver,
British Columbia, Canada

Application April 7, 1958, Serial No. 726,816

10 Claims. (Cl. 144—238)

This invention relates to a wobble dado assembly for cutting grooves and notches in pieces of work, such as wood.

An object of the present invention is the provision of a dado assembly having a single blade so constructed that it will not whip during use.

Another object is the provision of a dado assembly including a disc with cutting bits radiating therefrom, said bits being wider than the blade and having cutting edges overlapping the blade faces so that the blade can reach into grooves made by the assembly when comparatively deep grooves are required.

Another object is the provision of a dado tool having cutting bits radiating from a blade in such a way that the latter braces each bit, thereby making it possible to use tungsten carbide steel bits.

Wobble dado assemblies have been in existence for a number of years. These, however, have not been very successful. Most of the dado tools of this type consist of a blade mounted to wobble during rotation, the degree of wobble being adjustable for grooves of different widths. These have not been very satisfactory since the blades tend to whip during high speed rotation, and as the degree of whip varies with changes in rotation speed, the cutters are unreliable. Another type of dado cutting tool has a plurality of cutting bits radiating from a thick rotary head. The head is made thick in order to prevent whip, but the construction is such that the bits have to be made comparatively long since the head cannot extend into the groove formed by the tool during operation thereof. This construction is comparatively complicated, and the tool is not very practical since the long bits do not stand up very well during operation. If the bits could be made of tungsten carbide steel or the like, they would be very satisfactory. But such metal cannot be used in the cutting tool under consideration since it is too brittle, as the comparatively long bits would quickly chip or break off, a very dangerous thing when it is considered that these tools rotate at high speed when in operation.

The present dado assembly overcomes all these disadvantages. It includes a rigid flat blade having reinforcing ribs on opposite faces thereof near its periphery to brace the blade and prevent whipping thereof during high speed rotation. A plurality of cutting bits are secured to and radiate from the blade, and the latter is so constructed that it backs up each bit to near the outer end thereof. This makes it possible to form the blades of tungsten carbide steel or the like. As the blade is not subjected to whip and the bits are well supported and braced, the bits do not break or chip during use. Each bit has a leading cutting edge at a side thereof that overlaps a face of the blade, some of said cutting edges being located on opposite sides of the blade. This arrangement enables the blade to reach into grooves when comparatively deep grooves are required.

A wobble dado assembly according to the present invention comprises a rigid flat blade of substantially circular shape and formed with an offset central flat section lying at an angle to and extending across the general plane of the blade, said central section forming reinforcing ribs on opposite faces of the blade near the periphery thereof. A plurality of cutting bits are mounted in the blade and project a little beyond its periphery. A circular opening is formed in the offset section centrally thereof and centrally of the blade, and a pair of gripping plates are rotatably mounted relative to the offset section with one against each of the opposite faces thereof, said plates having complementary inclined inner surfaces bearing against the adjacent faces of the offset section and outer surfaces parallel to each other. A sleeve rotatably fits in the offset section opening and extends between and is connected to the plates, and a bore extends through the sleeve and plates normal to the outer surfaces of the latter, whereby rotation of the plates relative to the blade adjusts the wobble of the bits that takes place when the plates are clamped to the blade during rotation of the assembly.

An example of this invention is illustrated in the accompanying drawings, in which Figure 1 is a side elevation of the dado assembly with part thereof broken away, Figure 2 is an edge view of the assembly mounted on an arbor or shaft, Figure 3 is an edge view of the assembly alone, Figure 4 is a section through the assembly taken on the line 4—4 of Figure 1, set to cut a groove of the minimum width within the capacity of the tool, and Figure 5 is a view similar to Figure 4 with the assembly set to cut a groove of the maximum width.

Referring to the drawings, 10 is a wobble dado assembly including a rigid flat blade 11 formed of any suitable material, and preferably a low carbon steel. The blade is formed with an offset central flat section 15 lying at an angle to and extending across the general plane of the blade. This is clearly shown in Figure 4. It is preferable to form the offset section by means of pressure so high that the metal reaches a plastic flow state, in which case the natural grain structure of the blade is not destroyed. This offset section results in the formation of reinforcing ribs 17 and 18 on face 19 of the blade, and reinforcing ribs 21 and 22 on the opposite face 23 of the blade. The central section is circular in shape so that the reinforcing ribs extend around each blade face in substantially a circle spaced inwardly from the substantially circular general periphery of the blade, see Figure 1.

A plurality of cutting bits 29 are secured to and project outwardly from blade 11 at the periphery thereof. For this purpose, the blade is formed with a plurality of recesses 30 in the edge thereof and opening outwardly from said edge, and a bit fits in each of these recesses. Each bit is firmly secured to the blade in any convenient manner, such as by means of silver brazing.

As the bits 29 are identical in construction, only one will now be described in detail for the sake of convenience. The bit 29 extends across the general plane 32 of blade 11 at an angle thereto, see Figures 2 and 3. The bit has a side 34 projecting from a face of the blade, with a leading cutting edge 35 on said side and overlapping the adjacent blade face, as indicated at 36 in Figure 1. The bit leans forwardly in the direction of rotation of the blade, indicated by arrow 37, to form a gullet 39 immediately ahead of the bit. Although the side 41 of the bit opposite side 34 may be flush with the adjacent face of the blade 11, it is preferable to have it project laterally from said face, and this side overlaps the latter face.

The outer end 43 of the bit is flat and inclined inwardly towards the blade 11 from a point 44 at the outer end of the leading cutting edge 35 of said bit. This forms a transverse outer cutting edge 46 extending across the plane 32 of the blade at an angle thereto. This cutting edge 46 actually extends rearwardly from point 44 relative to the direction of rotation of the blade.

By referring to Figure 1, it will be noted that the sides 34 of some of the bits 29 overlap face 19 of the blade, while the sides 34 of the other bits overlap blade face 23. This places some of the leading cutting edges 35 and points 44 of the bits on one side of the blade, and the remainder on the opposite side thereof. In other words, some of the bits act as left hand cutters and the remainder right hand cutters. All the cutting edges 35 on one side of the blade are located in a common plane 48 that is parallel with the blade plane 32, while all the leading cutting edges on the opposite side of the blade are in a common plane 49 parallel with the first common plane and the blade plane. The distance 50 between planes 48 and 49, see Figure 4, represents the width of the narrowest cut that can be made by this tool, and this distance is equal to the effective width of the bits relative to the blade.

The actual edge of blade 11 is formed with an abutment 54 behind each bit 29. Each abutment starts at 55 near the inner end of one bit at the bottom of the gullet 39 thereof, and extends outwardly to a point 56 near the outer end of the next bit in a forward direction having regard to the direction of rotation of the blade. Each abutment backs up the bit 29 at its end 56 so that said bit may be made of a material, such as tungsten carbide steel, that is very satisfactory for cutting purposes, but which is very brittle. As the bits project laterally beyond the faces of the blade, said blade may extend into grooves being cut by the tool.

A circular opening 60 is formed in offset section 15 centrally thereof and centrally of blade 11. A pair of gripping plates 62 and 63 are rotatably mounted relative to the offset section with one against each of the opposite faces thereof, said plates being smaller than said offset section. Plates 62 and 63 have complementary inclined inner surfaces 65 and 66, respectively, slidably bearing against adjacent faces of section 15, and outer surfaces 68 and 69 parallel to each other, see Figures 4 and 5. A sleeve 72 rotatably fits in offset section opening 60 and extends between and is connected to plates 62 and 63. In this example, the sleeve is integrally connected to plate 63 and projects outwardly from the inclined surface 66 thereof into a circular recess 73 formed in the inclined surface 65 of plate 62 centrally thereof. One or more suitable pins 75 extend through plate 63 and its sleeve 75, and into plate 62 firmly to secure said elements together, see Figure 4. It should be kept in mind that these plates are secured together in such a way that they may be rotated as a unit relative to blade 11. However, when these plates are subjected to a clamping action, they are firmly pressed against the blade so that relative rotation cannot take place.

A bore 76 extends through the gripping plates 62 and 63 and sleeve 72 normal to the outer surfaces 68 and 69 of said plates. If desired, a bushing 77 may be fitted into this bore.

Figures 2 and 5 show the dado assembly mounted on a reduced portion 80 of a shaft or arbor 81. Washers or discs 82 and 83 are located on opposite sides of the assembly against plate surfaces 68 and 69, and when nut 84 is tightened on the threaded outer end 85 of the reduced section 80, plates 62 and 63 are clamped to blade 11, and the assembly is firmly pressed against shoulder 86 formed on the arbor or shaft 81. The gripping plate unit is normal to the axis 87 of the shaft or arbor around which the assembly rotates.

Graduations 88 may be provided on the periphery of one of the gripping plates, for example, plate 62, to enable the assembly to be set to cut grooves of selected widths. These graduations cooperate with a marker 89 on the offset section 15 of the blade 11, see Figure 1.

As previously stated, the effective width of bits 29 determines the minimum width of a groove that may be cut by assembly 10. For example, if the effective width of the bits is ¼ inch, then the narrowest groove that may be cut would be ¼ inch wide. The angle of the offset section 15 relative to the general plane 32 of the blade and the incline of the surfaces 65 and 66 of gripping plates 62 and 63 are such that when the plate unit is rotated to the position shown in Figure 4, the incline of the plates offsets the incline of the centre section so that the outer plate surfaces 68 and 69 lie parallel to the general plane 32 of the blade. At this time, the blade and the bits 29 thereof extend at right angles to the axis 87 of shaft or arbor 81. The graduation ¼ on plate 62 is at marker 89, and rotation of the assembly results in the formation of a groove 91 in a piece of work 92 that is ¼ inch wide since the assembly does not wobble during rotation with this setting.

When the plates 62—63 are rotated to bring the surfaces 65 and 66 thereof into positions where they add to thet angle of the centre section 15 relative to the plane of blade 11, the latter plane lies at the maximum angle relative to the outer faces 68—69 of the plate unit and to the axis 87 of shaft or arbor 81. When the assembly is rotated with this setting, the blade wobbles back and forth relative to axis 87 so that the bits 29 cut a groove 94 of maximum width within the scope of this tool in work piece 95, see Figure 5. Grooves of different widths may be cut by rotating the gripping plate units to different positions between the minimum and maximum settings represented in Figures 4 and 5.

As the assembly 10 is rotated, the leading cutting edges 35, tips or points 44, and transverse cutting edges 46 of the bits cut through the material of the work piece. As some of the leading cutting edges are located on one side of blade 11, and the remainder on the opposite side thereof, the material is cut away cleanly on oppoiste sides of the blade to form the sides of the grooves. Tips 44 and transverse cutting edges 46 form the bottoms of the grooves.

The reinforcing ribs 17, 18, 21 and 22 brace blade 11 near the periphery thereof so that they prevent whipping of said blade during rotation of the assembly at high speed. The abutments 54 brace bits 29 at the backs thereof and almost all the way to their outer ends. As the leading cutting edges of the bits are located beyond the adjacent faces of the blade, the latter may extend into the grooves cut by the assembly so that relatively deep grooves may be cut without having the bits project unduly from the blade periphery.

The bits may be formed of any suitable material, such as high speed steel or tungsten carbide steel. The latter is preferred since it results in bits that retain sharp cutting edges for much longer periods than most other materials. As the reinforcing ribs prevent whipping, and the abutments brace the bits, tungsten carbide steel may be successfully used in these bits.

What I claim as my invention is:

1. A wobble dado assembly comprising a rigid flat blade of substantially circular shape and formed with an offset central flat section lying at an angle to and extending across the general plane of the blade, said central section forming reinforcing ribs on opposite faces of the blade near the periphery thereof, a plurality of cutting bits mounted in the blade and projecting a little beyond it periphery, each bit leaning forward in the direction of rotation of the blade to form a gullet immediately ahead of said bit, an abutment on the periphery of the blade behind and bearing against the back of each bit relative to the direction of movement thereof and extending near the outer end of said bit to reinforce the latter, an opening in the offset section centrally thereof and centrally of the blade, a pair of gripping plates rotatably mounted relative to the offset section with one against each of the opposite faces thereof, said plates having complementary inclined inner surfaces bearing against the adjacent faces of the offset section and outer surfaces parallel to each other, means extending through the offset section opening and interconnecting the plates for rotational movement together, and a bore extending through both plates and the offset section opening normal to the outer surfaces of said plates, whereby rotation of the plates relative to the blade adjusts the wobble of the bits that takes place when the plates are clamped to the blade during rotation of the assembly.

2. A wobble dado assembly comprising a rigid flat blade of substantially circular shape and formed with an offset central flat section lying at an angle to and extending across the general plane of the blade, said central section forming reinforcing ribs on opposite faces of the blade near the periphery thereof, a plurality of cutting bits mounted in the blade and projecting a little beyond its periphery, each bit projecting from at least one face of the blade, a leading cutting edge on the side of each bit projecting from the blade face, each cutting edge overlapping the adjacent blade face and all the cutting edges at each face of the blade being in a common plane that is parallel to the common plane of the cutting edges on the opposite side of the blade, the distance between said common planes representing the width of the narrowest cut that can be made by the assembly, a circular opening in the offset section centrally thereof and centrally of the blade, a pair of gripping plates rotatably mounted relative to the offset section with one against each of the opposite faces thereof, said plates having complementary inclined inner surfaces bearing against the adjacent faces of the offset section and outer surfaces parallel to each other, a sleeve rotatably fitting in the offset section opening and extending between and connected to the plates, and a bore extending through the sleeve and plates normal to the outer surfaces of the latter, whereby rotation of the plates relative to the blade adjusts the wobble of the bits that takes place when the plates are clamped to the blade during rotation of the assembly.

3. A dado assembly as claimed in claim 2 in which each bit extends across the plane of the blade at an angle thereto, and the cutting edge of each bit is formed at the leading corner of the bit with reference to the direction of travel thereof.

4. A dado assembly as claimed in claim 3 in which the outer end of each bit is flat and is inclined inwardly towards the blade from a point at the outer end of the leading cutting edge of said bit.

5. A dado assembly as claimed in claim 2 in which each bit is secured in a recess in and opening out from the periphery of the blade, and said periphery is shaped to bear against the back of each bit relative to the direction of movement thereof to near the outer end of said bit to reinforce the latter.

6. A wobble dado assembly comprising a rigid flat blade of substantially circular shape and formed with an offset central flat section lying at an angle to and extending across the general plane of the blade, said central section forming reinforcing ribs on opposite faces of the blade near the periphery thereof, a plurality of cutting bits mounted in the blade and projecting a little beyond its periphery, each bit being wider than the blade and projecting from both faces thereof, a leading cutting edge on each bit extending from the outer end inwardly to overlap a face of the blade, the leading cutting edge of some bits being in a common plane and overlapping one face of the blade and of the other bits being in another common plane parallel to the first common plane and overlapping the opposite face of the blade, the distance between said common planes representing the width of the narrowest cut that can be made by the assembly, a circular opening in the offset section centrally thereof and centrally of the blade, a pair of gripping plates rotatably mounted relative to the offset section with one against each of the opposite faces thereof, said plates having complementary inclined inner surfaces bearing against the adjacent faces of the offset section and outer surfaces parallel to each other, a sleeve rotatably fitting in the offset section opening and extending between and connected to the plates, and a bore extending through the sleeve and plates normal to the outer surfaces of the latter, whereby rotation of the plates relative to the blade adjusts the wobble of the bits that takes place when the plates are clamped to the blade during rotation of the assembly.

7. A wobble dado assembly comprising a rigid flat blade of substantially circular shape and formed with an offset central flat section lying at an angle to and extending across the general plane of the blade, said central section forming reinforcing ribs on opposite faces of the blade near the periphery thereof, a plurality of cutting bits mounted in the blade and projecting a little beyond its periphery, each bit being wider than the blade and projecting from both faces thereof, a leading cutting edge on each bit extending inwardly from the outer end thereof, the leading cutting edge of some bits being in a common plane near one face of the blade and of the other bits being in another common plane parallel to the first common plane near the opposite face of the blade, the distance between said common planes representing the width of the narrowest cut that can be made by the assembly, an opening in the offset section centrally thereof and centrally of the blades, a pair of gripping plates rotatably mounted relative to the offset section with one against each of the opposite faces thereof, said plates having complementary inclined inner surfaces bearing against the adjacent faces of the offset section and outer surfaces parallel to each other, means extending through the offset section opening and interconnecting the plates for rotational movement together, and a bore extending through both plates and the offset section opening normal to the outer surfaces of said plates, whereby rotation of the plates relative to the blade adjusts the wobble of the bits that takes place when the plates are clamped to the blade during rotation of the assembly.

8. A wobble dado assembly as claimed in claim 7 in which each bit extends across the plane of the blade at an angle thereto, and the cutting edge of each bit is formed at the leading corner of the bit with reference to the direction of travel thereof, and spaced laterally from the general plane of the blade.

9. A wobble dado assembly as claimed in claim 8 in which the outer end of each bits is flat and is inclined inwardly towards the blade from a point at the outer end of the leading cutting edge of said bit, and said outer end of the bit is formed with a cutting edge extending from said point across the general plane of the blade.

10. A wobble dado assembly as claimed in claim 7 in which each bit is secured in a recess in and opening out from the periphery of the blade, and said periphery is formed with an abutment behind and bearing against the back of each blade relative to the direction of movement thereof and extending to near the outer end of said bit to reinforce the latter.

References Cited in the file of this patent

UNITED STATES PATENTS

| | | |
|---|---|---|
| 432,824 | Fox | July 22, 1890 |
| 447,716 | Fox | Mar. 3, 1891 |
| 2,665,722 | Edgemond | Jan. 12, 1954 |
| 2,683,476 | Courcier | July 13, 1954 |
| 2,845,102 | Woodell | July 29, 1958 |